(12) United States Patent
Roux et al.

(10) Patent No.: US 7,243,248 B1
(45) Date of Patent: Jul. 10, 2007

(54) METHOD AND SYSTEM FOR PROVIDING REDUNDANT POWER TO A DISK DRIVE SYSTEM

(75) Inventors: Phillip J. Roux, Sutton, MA (US); Michael A. Faulkner, Grafton, MA (US); Paul H. Maier, Jr., Athol, MA (US)

(73) Assignee: EMC Corporation, Hopkinton, MA (US)

( * ) Notice: Subject to any disclaimer, the term of this patent is extended or adjusted under 35 U.S.C. 154(b) by 393 days.

(21) Appl. No.: 10/812,490

(22) Filed: Mar. 30, 2004

(51) Int. Cl.
*G06F 1/00* (2006.01)
*G06F 13/00* (2006.01)

(52) U.S. Cl. ........................ 713/300; 711/114
(58) Field of Classification Search ............... 713/300; 711/114
See application file for complete search history.

(56) References Cited

U.S. PATENT DOCUMENTS

| | | | | |
|---|---|---|---|---|
| 5,088,081 A | * | 2/1992 | Farr | 369/47.14 |
| 5,325,363 A | * | 6/1994 | Lui | 714/6 |
| 5,708,771 A | * | 1/1998 | Brant et al. | 714/22 |
| 5,745,670 A | * | 4/1998 | Linde | 714/22 |
| 5,881,215 A | * | 3/1999 | Alft | 714/14 |
| 6,504,730 B1 | * | 1/2003 | Cooney et al. | 361/826 |
| 6,618,821 B1 | * | 9/2003 | Duncan et al. | 714/14 |
| 6,735,704 B1 | * | 5/2004 | Butka et al. | 713/300 |
| 6,856,045 B1 | * | 2/2005 | Beneditz et al. | 307/43 |
| 6,943,463 B2 | * | 9/2005 | Goerke et al. | 307/66 |
| 2004/0070908 A1 | * | 4/2004 | Corcoran et al. | 361/93.1 |

* cited by examiner

*Primary Examiner*—Thomas Lee
*Assistant Examiner*—Ji H. Bae
(74) *Attorney, Agent, or Firm*—Krishnendu Gupta; Scott A. Ouellette

(57) ABSTRACT

A data storage system includes a disk drive assembly having a plurality of disk drives, a first processor for controlling access to the disk drive assembly, a second processor for controlling access to the disk drive assembly, a first power supply for supplying power to the first processor and to the disk drive assembly and a second power supply for supplying power to the second processor and to the disk drive assembly.

15 Claims, 2 Drawing Sheets

METHOD AND SYSTEM FOR PROVIDING REDUNDANT POWER TO A DISK DRIVE SYSTEM

FIELD OF THE INVENTION

The present invention is directed generally to power supply systems and more particularly to a method and system for providing redundant power to a high-availability disk drive system.

BACKGROUND OF THE INVENTION

To provide consistent, high-performance client support, many businesses rely on high-availability data storage systems. High-availability data storage systems are designed with a level of redundancy in order to provide fault tolerance for single points of failure. Two components that are typically replicated in high-availability designs are the storage processors and the power supply. In the event that one of the processors or the power supply fails, the back-up component of the redundant pair is utilized to continue the operation of the data storage system.

Such redundancy of the power sources in high-availability systems typically relies on full N+1 redundancy of all of the power supply outputs which are shared between all of the attached loads, such as the processors and disk drive arrays. However, the disadvantage of such redundancy is that the power system, when not redundant, must power the entire load. The N+1 redundancy arrangement requires N+1 times the power capacity from the power system than that which would be necessary to power a non-redundant system. The additional power requirements of the N+1 redundant system adds cost and complexity to the data storage system and increases the space requirements of the power supply system within the data storage system.

SUMMARY OF THE INVENTION

The present invention is directed to a power supply system for a data storage system which utilizes non-redundant power supplies configured in such a way as to provide redundant power to components of the data storage system that require redundant power to support high-availability operation, while providing non-redundant power to components of the data storage system that do not require redundant power. In particular, the power supply system is configured to supply redundant power to the disk drive array of the data storage system, while providing non-redundant power to other loads in the system, such as the storage processors which control access to the disk drives included in the disk drive array.

According to one aspect of the invention, a data storage system includes a disk drive assembly including a plurality of disk drives, a first processor for controlling access to the disk drive assembly, a second processor for controlling access to the disk drive assembly, a first power supply for supplying power to the first processor and to the disk drive assembly and a second power supply for supplying power to the second processor and to the disk drive assembly.

The first power supply and the second power supply each may include a first voltage output and the data storage system may further include a first bus coupled between the first voltage output of the first power source, the first voltage output of the second power source and at least a portion of the plurality of disk drives of the disk drive array. The first power supply and the second power supply each may include a second voltage output and the data storage system may further include a second bus coupled between the second voltage output of the first power source, the second voltage output of the second power source and at least a portion of the plurality of disk drives of the disk drive array. The first power supply and the second power supply each may include a third voltage output, wherein the third voltage output of the first power supply supplies power to the first processor and the third voltage output of the second power supply supplies power to the second processor. The first power supply and the second power supply each include a first voltage output, wherein the first voltage output of the first power supply supplies power to the first processor and the first voltage output of the second power supply supplies power to the second processor. The data storage system may further include a first circuit protection device coupled between the first power supply and the disk drive assembly. The data storage system may further include a second circuit protection device coupled between the second power supply and the disk drive assembly. The first and second circuit protection devices may include at least one of a power source fault protection device and a load fault protection device.

According to another aspect of the invention, a data storage system includes a disk drive assembly including a plurality of disk drives, a first processor for controlling access to the disk drive assembly, a first power supply for supplying power to the first processor and to the disk drive assembly and a second power supply for supplying power to the disk drive assembly. The first power supply and the second power supply each include a first voltage output, the data storage system further including a first bus coupled between the first voltage output of the first power source, the first voltage output of the second power source and at least a portion of the plurality of disk drives of the disk drive array.

The data storage system may further include a second processor for controlling access to the disk drive assembly, the second processor receiving power from the second power source. The first power supply and the second power supply each may include a second voltage output and the second voltage output of the first power supply may be configured to supply power to the first processor and the second voltage output of the second power supply being configured to supply power to the second processor. The first power supply and the second power supply each may include a third voltage output and the data storage system may further include a second bus coupled between the third voltage output of the first power source, the third voltage output of the second power source and at least a portion of the plurality of disk drives of the disk drive array. The data storage system may further include a first circuit protection device coupled between the first power supply and the disk drive assembly. The data storage system may further include a second circuit protection device coupled between the second power supply and the disk drive assembly. The first and second circuit protection devices may include at least one of a power source fault protection device and a load fault protection device.

According to another aspect of the invention, a redundant power supply system includes a circuit subsystem, a first device for controlling access to the circuit subsystem, a second device for controlling access to the circuit subsystem, a first power supply for supplying power to the first device and to the circuit subsystem and a second power supply for supplying power to the second device and to the circuit subsystem.

The first power supply and the second power supply each may include a first voltage output, and the redundant power supply system may further include a first bus coupled between the first voltage output of the first power source, the first voltage output of the second power source and the first circuit subsystem. The first power supply and the second power supply each may include a second voltage output, and the redundant power supply system may further include a second bus coupled between the second voltage output of the first power source, the second voltage output of the second power source and the circuit subsystem. The first power supply and the second power supply each may include a third voltage output, wherein the third voltage output of the first power supply supplies power to the first device and the third voltage output of the second power supply supplies power to the second device.

According to yet another aspect of the invention, a method of supplying power to a disk drive system includes:

A. supplying power from a first power supply to a disk drive assembly including a plurality of disk drives;

B. supplying power from the first power supply to a first processor which controls access to the disk drive assembly;

C. supplying power from a second power supply to the disk drive assembly; and

D. supplying power from the second power supply to a second processor which controls access to the disk drive assembly.

The method may further include supplying power from a first voltage output of the first power supply and a first voltage output of the second power supply to the disk drive array over a first bus. The method may further include supplying power from a second voltage output of the first power supply and a second voltage output of the second power supply to the disk drive array over a second bus. The method may further include supplying power from a third voltage output of the first power supply to the first processor and supplying power from a third voltage output of the second power supply to the second processor. The method may further include supplying power to the disk drive assembly with one of the first and second power supplies when the other of the first and second power supplies becomes disabled.

According to yet another aspect of the invention, a data storage system includes a disk drive assembly including a plurality of disk drives, a first circuit subsystem, a second circuit subsystem, a first power supply for supplying power to the first circuit subsystem and to the disk drive assembly and a second power supply for supplying power to the second circuit subsystem and to the disk drive assembly.

The first power supply and the second power supply each may include a first voltage output and the data storage system may further include a first bus coupled between the first voltage output of the first power source, the first voltage output of the second power source and at least a portion of the plurality of disk drives of the disk drive array. The first power supply and the second power supply each may include a second voltage output and the data storage system may further include a second bus coupled between the second voltage output of the first power source, the second voltage output of the second power source and at least a portion of the plurality of disk drives of the disk drive array. The first power supply and the second power supply each may include a third voltage output, wherein the third voltage output of the first power supply supplies power to the first circuit subsystem and the third voltage output of the second power supply supplies power to the second circuit subsystem. The first power supply and the second power supply each include a first voltage output, wherein the first voltage output of the first power supply supplies power to the first circuit subsystem and the first voltage output of the second power supply supplies power to the second circuit subsystem. The data storage system may further include a first circuit protection device coupled between the first power supply and the disk drive assembly. The data storage system may further include a second circuit protection device coupled between the second power supply and the disk drive assembly. The first and second circuit protection devices may include at least one of a power source fault protection device and a load fault protection device.

BRIEF DESCRIPTION OF THE DRAWINGS

These and other features of the invention will become more readily apparent from the following detailed description when read together with the accompanying drawings, in which.

DETAILED DESCRIPTION

Figure 1:
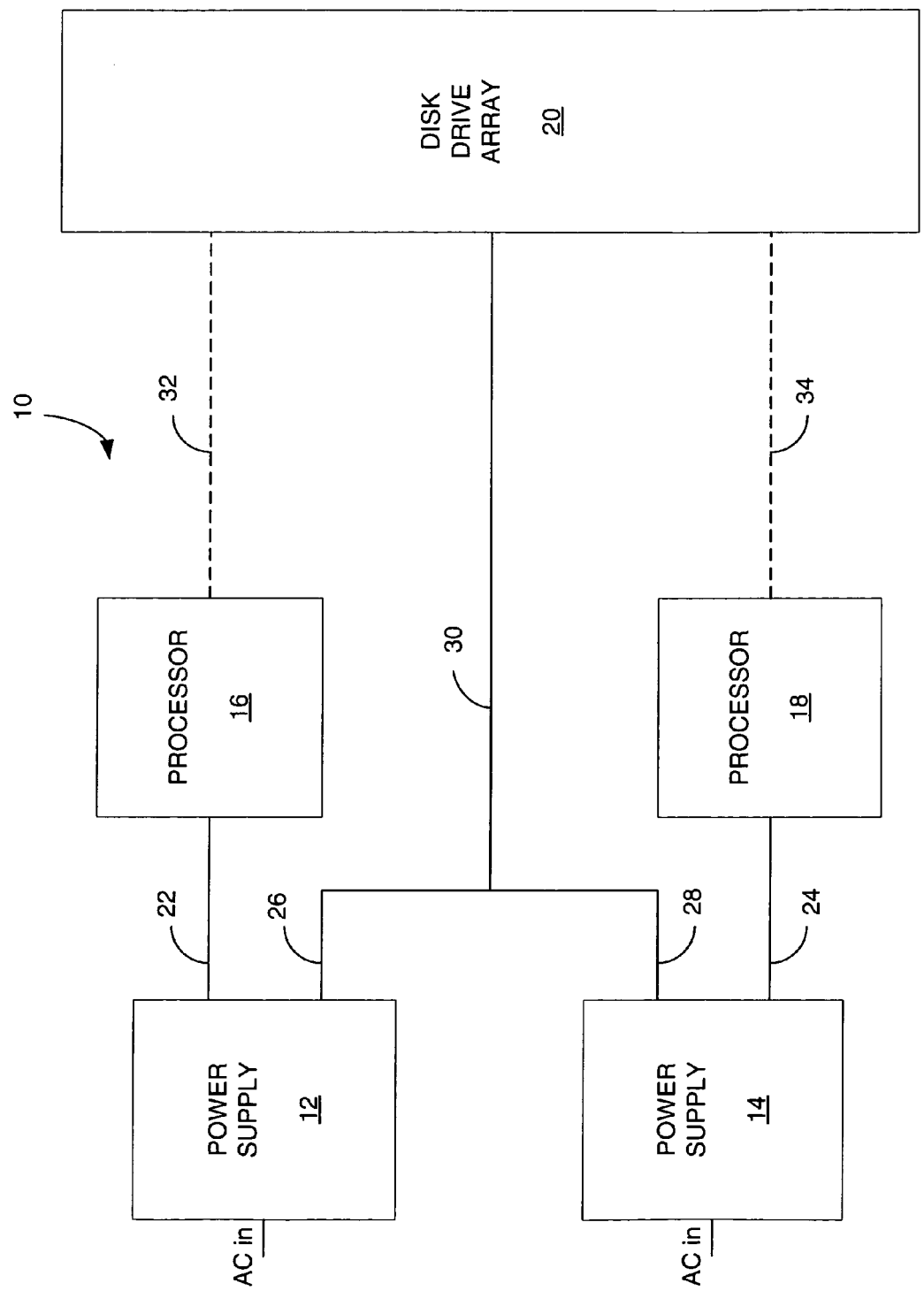
FIG. 1 is a general block diagram of the system for providing redundant power to a disk drive system in accordance with the present invention.

FIG. 1 is a general block diagram of a system 10 for providing redundant power to a disk drive system. The system 10 includes a first power supply 12 and a second power supply 14. Power supply 12 receives an AC input and outputs a first DC voltage to a first circuit subsystem, such as storage processor 16, via output 22 and a second DC voltage to a disk drive array 20 via output 26. Likewise, power supply 14 receives an AC input and outputs a first DC voltage to a second circuit subsystem, such as storage processor 18, via output 24 and a second DC voltage to the disk drive array 20 via output 28. The values of the DC voltages output by the power supplies 12 and 14 may differ from each other and are dependent on the voltage requirements of the load to which each DC voltage is provided.

Storage processors 16 and 18 operate to provide access to the disk drive array 20 to enable data to be written to and read from the plurality of disks that make up the disk drive array 20. Data is transferred between the storage processors 16 and 18 and the disk drive array 20 over data transmission lines 32 and 34, respectively. The specific operation of the storage processors 16 and 18 is known in the art and will not be described. However, it will be understood that storage processors 16 and 18 operate in a redundant manner, such that, if one of the storage processors is disabled, the other storage processor will process any read or write requests that the disabled storage processor would have processed.

As shown in FIG. 1, output 26 of power supply 12 and output 28 of power supply 14 are commonly coupled to disk drive array 20 through bus 30, such that, in the event that one of the power supplies 12 or 14 is disabled, the other, functioning power supply increases its output current in response to the new load demand, and is able to continue supplying power to the disk drive array 20. This is possible because, in the situation where the outputs of two different power supplies are combined to make one output, the supply output is designed such that the total current demand or load for that one output does not exceed the rating of any single power supply, when the arrangement consists of two supplies, configured in a 1+1 arrangement. Contrary to prior art power supplies having built-in redundancy, which adds to the cost and complexity of the supply, as well as the amount of space required to house the redundant power supplies, the power supplies 12 and 14 may be standard non-redundant, multiple-output power supplies. This enables the disk drive array to be redundantly powered without the extra expense, complexity and space required in prior art fully redundant power systems.

Figure 2:
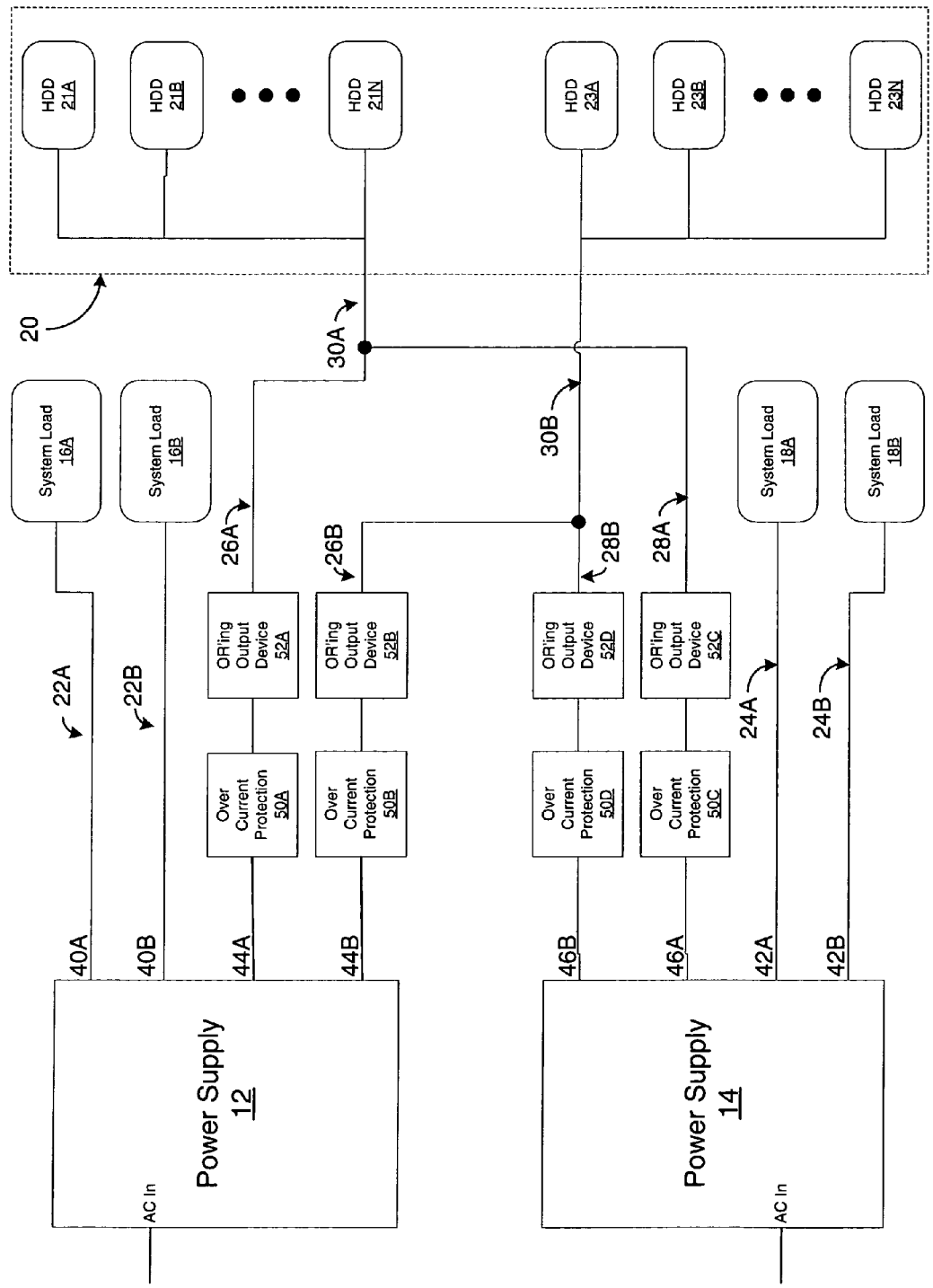
FIG. 2 is a detailed block diagram of the system for providing redundant power to a disk drive system in accordance with the present invention.

FIG. 2 is a detailed block diagram of one embodiment 100 of the redundant power supply system. Redundant power system 100 includes first power supply 12 and second power supply 14. Power supply 12 includes multiple voltage outputs including a voltage output 40A and a voltage output 40B, which supply power to system loads 16A and 16B over lines 22A and 22B, respectively in a non-redundant fashion. Likewise, power supply 14 includes multiple voltage outputs including a voltage output 42A and a voltage output 42B, which supply power to system loads 18A and 18B over lines 24A and 24B, respectively in a non-redundant fashion. System loads 16A, 16B, 18A and 18B may be storage processors, as shown in FIG. 1, other circuit subsystems in the data storage system such as memory circuits and data bus controllers, or a combination of storage processors and circuit subsystems. For simplicity, any data lines between storage processors and the disk drive array 20 are not shown in FIG. 2. The specific voltage output to these loads from each output may vary, depending on the requirements of the load to which the voltage is supplied.

Output 44A of power supply 12 and output 46A of power supply 14 are coupled to a first voltage bus 30A via lines 26A and 28A, respectively. Bus 30A is coupled to disk drive array 20 to supply voltage from the power supplies 12 and 14 to a first group of hard disk drives 21A-21N that are included within the disk drive array 20 in a redundant fashion. Similarly, output 44B of power supply 12 and output 46B of power supply 14 are coupled to a second voltage bus 30B via lines 26B and 28B, respectively. Bus 30B is also coupled to disk drive array 20 to supply voltage from the power supplies 12 and 14 to a second group of hard disk drives 23A-23N that are included within the disk drive array 20 in a redundant fashion.

In order to isolate both the power supplies 12 and 14 and the disk drives 21A-21N and 23A-23N from faults in the system that could either cause damage to the components, or cause interruptions in supply voltage across the whole disk array system, system 100 includes over-current protection devices 50A-50D and ORing output devices 52A-52D. Specifically, over-current protection device 50A and ORing output device 52A are connected in series on line 26A between output 44A of power supply 12 and bus 30A and over-current protection device 50B and ORing output device 52B are connected in series on line 26B between output 44B of power supply 12 and bus 30B. Likewise, over-current protection device 50C and ORing output device 52C are connected in series on line 28A between output 46A of power supply 14 and bus 30A and over-current protection device 50D and ORing output device 52D are connected in series on line 28B between output 46B of power supply 14 and bus 30B.

Over-current protection devices 50A-50D generally operate to protect the power supplies 12 and 14 from being damaged by faults in any of the disk drives 21A-21N and 23A-23N. The devices also isolate the protected outputs 44A-44B and 46A-46B from over-current conditions that would otherwise shutdown the entire supply, and compromise redundancy provided by the individual power supplies. ORing output devices 52A-52D generally operate to prevent the disk drives 21A-21N and 23A-23N from loss of supply voltage, should an internal short to ground fault occur on output 44A or 44B of power supply 12 or on output 46A or 46B of power supply 14. The specific operation and configuration of over-current protection devices 50A-50D and ORing output devices 52A-52D are known in the art and therefore will not be described.

Accordingly, the present invention provides a redundant power system including non-redundant power supplies for providing power to components of a data storage system that require redundant power, while also providing power to components of the data storage system that do not require redundant power. This enables the data storage system to use standard, commodity, non-redundant power supplies, which reduces the cost, complexity and space requirements of the data storage system.

It will be understood that, while the redundant power system has been described with reference to use within a data storage system for the purpose of supplying redundant power to a disk drive array and non-redundant power to storage processors and other components of the system, the power system architecture of the invention may also be utilized for supplying power to other types of systems which require redundant power for some components and non-redundant power for others. For example, any circuit subsystems that are redundant in nature and share connectivity to other sections that must remain powered should other redundant sections may utilize the power system architecture of the present invention.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A data storage system comprising:
 a disk drive assembly including a plurality of disk drives;
 a first processor for controlling access to the disk drive assembly;
 a second processor for controlling access to the disk drive assembly;
 a first power supply for supplying power to the first processor and to the disk drive assembly; and
 a second power supply for supplying power to the second processor and to the disk drive assembly;
 wherein the first power supply and the second power supply each include a first voltage output, the data storage system further including a first bus coupled between the first voltage output of the first power supply, the first voltage output of the second power supply and at least a portion of the plurality of disk drives of the disk drive assembly; and
 wherein the first power supply and the second power supply each include a second voltage output, the data storage system further including a second bus coupled between the second voltage output of the first power supply, the second voltage output of the second power supply and at least a portion of the plurality of disk drives of the disk drive assembly.

2. The data storage system of claim 1 wherein the first power supply and the second power supply each include a third voltage output, wherein the third voltage output of the first power supply supplies power to the first processor and the third voltage output of the second power supply supplies power to the second processor.

3. The data storage system of claim 1 further comprising a first circuit protection device coupled between the first power supply and the disk drive assembly.

4. The data storage system of claim 3 further comprising a second circuit protection device coupled between the second power supply and the disk drive assembly.

5. The data storage system of claim 4 wherein the first and second circuit protection devices comprise at least one of a power source fault protection device and a load fault protection device.

6. A redundant power supply system comprising:
a circuit subsystem;
a first device for controlling access to the circuit subsystem;
a second device for controlling access to the circuit subsystem;
a first power supply for supplying power to the first device and to the circuit subsystem; and
a second power supply for supplying power to the second device and to the circuit subsystem;
wherein the first power supply and the second power supply each include a first voltage output, the redundant power supply system further including a first bus coupled between the first voltage output of the first power supply, the first voltage output of the second power supply and the circuit subsystem; and
wherein the first power supply and the second power supply each include a second voltage output, the redundant power supply system further including a second bus coupled between the second voltage output of the first power supply the second voltage output of the second power supply and the circuit subsystem.

7. The redundant power supply system of claim 6 wherein the first power supply and the second power supply each include a third voltage output, wherein the third voltage output of the first power supply supplies power to the first device and the third voltage output of the second power supply supplies power to the second device.

8. A method of supplying power to a disk drive system comprising:
A. supplying, over a first bus, power from a first voltage output of a first power supply and a first voltage output of a second power supply to a disk drive assembly including a plurality of disk drives;
B. supplying power from the first power supply to a first processor which controls access to the disk drive assembly;
C. supplying, over a second bus, power from a second voltage output of the first power supply and a second voltage output of the second power supply to the disk drive assembly; and D. supplying power from the second power supply to a second processor which controls access to the disk drive assembly.

9. The method of claim 8 further comprising supplying power from a third voltage output of the first power supply to the first processor and supplying power from a third voltage output of the second power supply to the second processor.

10. The method of claim 8 further comprising supplying power to the disk drive assembly with one of the first and second power supplies when the other of the first and second power supplies becomes disabled.

11. A data storage system comprising:
a disk drive assembly including a plurality of disk drives;
a first circuit subsystem;
a second circuit subsystem;
a first power supply for supplying power to the first circuit subsystem and to the disk drive assembly; and
a second power supply for supplying power to the second circuit subsystem and to the disk drive assembly;
wherein the first power supply and the second power supply each include a first voltage output, the data storage system further including a first bus coupled between the first voltage output of the first power supply, the first voltage output of the second power supply and at least a portion of the plurality of disk drives of the disk drive assembly; and
wherein the first power supply and the second power supply each include a second voltage output, the data storage system further including a second bus coupled between the second voltage output of the first power supply, the second voltage output of the second power supply and at least a portion of the plurality of disk drives of the disk drive assembly.

12. The data storage system of claim 11 wherein the first power supply and the second power supply each include a third voltage output, wherein the third voltage output of the first power supply supplies power to the first circuit subsystem and the third voltage output of the second power supply supplies power to the second circuit subsystem.

13. The data storage system of claim 11 further comprising a first circuit protection device coupled between the first power supply and the disk drive assembly.

14. The data storage system of claim 13 further comprising a second circuit protection device coupled between the second power supply and the disk drive assembly.

15. The data storage system of claim 14 wherein the first and second circuit protection devices comprise at least one of a power supply fault protection device and a load fault protection device.

* * * * *